United States Patent [19]

Cotton

[11] Patent Number: 5,408,977
[45] Date of Patent: Apr. 25, 1995

[54] FUEL TANK WITH CARBON CANISTER AND SHUT-OFF VALVE

[75] Inventor: Kenneth J. Cotton, Caro, Mich.

[73] Assignee: Walbro Corporation, Cass City, Mich.

[21] Appl. No.: 110,318

[22] Filed: Aug. 23, 1993

[51] Int. Cl.6 ............................................. F02M 33/02
[52] U.S. Cl. ................................. 123/520; 123/516
[58] Field of Search ............. 123/516, 518, 517, 519, 123/520, 198 D, 198 DB

[56] References Cited

U.S. PATENT DOCUMENTS

| | | | |
|---|---|---|---|
| 2,263,326 | 11/1941 | Yeager | 123/198 DB |
| 3,575,152 | 4/1971 | Wentworth | 123/520 |
| 3,802,403 | 4/1974 | Dewick | 123/520 |
| 3,884,204 | 5/1975 | Krautwurst | 123/519 |
| 3,913,545 | 10/1975 | Haase | 123/520 |
| 4,024,848 | 5/1977 | Lee | 123/516 |
| 4,203,401 | 5/1980 | Kingsley | 123/520 |
| 4,778,495 | 10/1988 | Bishop | 123/519 |
| 5,080,421 | 1/1992 | Otowa | 123/519 |
| 5,148,793 | 9/1992 | Reddy | 123/520 |
| 5,313,978 | 5/1994 | Takai | 123/516 |

Primary Examiner—Carl S. Miller
Attorney, Agent, or Firm—Barnes, Kisselle, Raisch, Choate, Whittemore & Hulbert

[57] ABSTRACT

A compact fuel tank assembly with a readily accessible shut-off valve, a carbon canister nested in the fuel tank for collecting evaporative emissions from the tank as well as from a float bowl of a carburetor, and an air vent and purge port for drawing stored evaporative emissions from the carbon canister into the carburetor for combustion in an engine. To prevent fuel splash from the tank from entering the canister, a fluid trap in the fuel tank passes fuel vapors and returns liquid fuel splash to the tank. Activated charcoal is retained in the carbon canister in a baffle array for drawing and storing vapors in the activated charcoal, as well as drawing off the stored vapors for combustion within the engine.

11 Claims, 2 Drawing Sheets

[5,408,977]

FUEL TANK WITH CARBON CANISTER AND SHUT-OFF VALVE

FIELD OF THE INVENTION

This invention relates generally to a fuel vapor control system for utility engines and more particularly to a compact fuel tank assembly for controlling evaporative emissions from a fuel tank and a carburetor bowl which eliminates fuel splash from the fuel tank and provides easy access to a fuel shut-off valve.

BACKGROUND OF THE INVENTION

Previously, carbon canisters have been used to contain evaporative emissions from automotive fuel tanks. Proposed new emissions regulations for small utility engines have necessitated development of a method of containing evaporative emissions from these small engines. However, small utility engines are mounted in confined locations, especially on power tools, and an evaporative emissions system must be developed which is compact and relatively inexpensive in order for them to be compatible with current engine applications. For example, when containing evaporative emissions from a gas powered lawn mower or weed trimmer, the engine fuel delivery, storage and evaporative emissions components must be provided for in a compact and efficient array in order to meet both packaging and cost requirements for these applications.

SUMMARY OF THE INVENTION

A fuel tank assembly of this invention has a fuel tank constructed to receive and carry a carbon canister with a vapor port on the canister that receives evaporative emissions from the tank for storage in activated charcoal within the canister. A vapor vent on a float bowl carburetor communicates with the canister to transfer evaporative emissions from the bowl for storage in the canister. The carbon canister communicates with a ported orifice on the engine carburetor for releasing evaporative emissions stored in the canister into the carburetor and engine for combustion.

Objects, features and advantages of this invention are to provide a fuel container assembly with a fuel tank, a carbon canister and a fuel shut-off valve which is compact, integrated to control evaporative emissions from the fuel tank and a carburetor bowl, eliminates fuel splashing out of the tank through a vapor vent on the tank, provides easy access to fuel shut-off, has an unvented fuel tank with a vapor space for allowing thermal expansion of fuel in the tank, a tank molded cavity for nesting and carrying the carbon canister, and is ideal for small utility engines for compact and lightweight tools, easy to assemble, rugged, durable, reliable, quick and easy to use, and of relatively simple design and economical manufacture.

BRIEF DESCRIPTION OF THE DRAWINGS

These and other objects, features and advantages of this invention will be apparent from the following detailed description of the best mode, appended claims and accompanying drawings in which:

DETAILED DESCRIPTION

Figure 1:
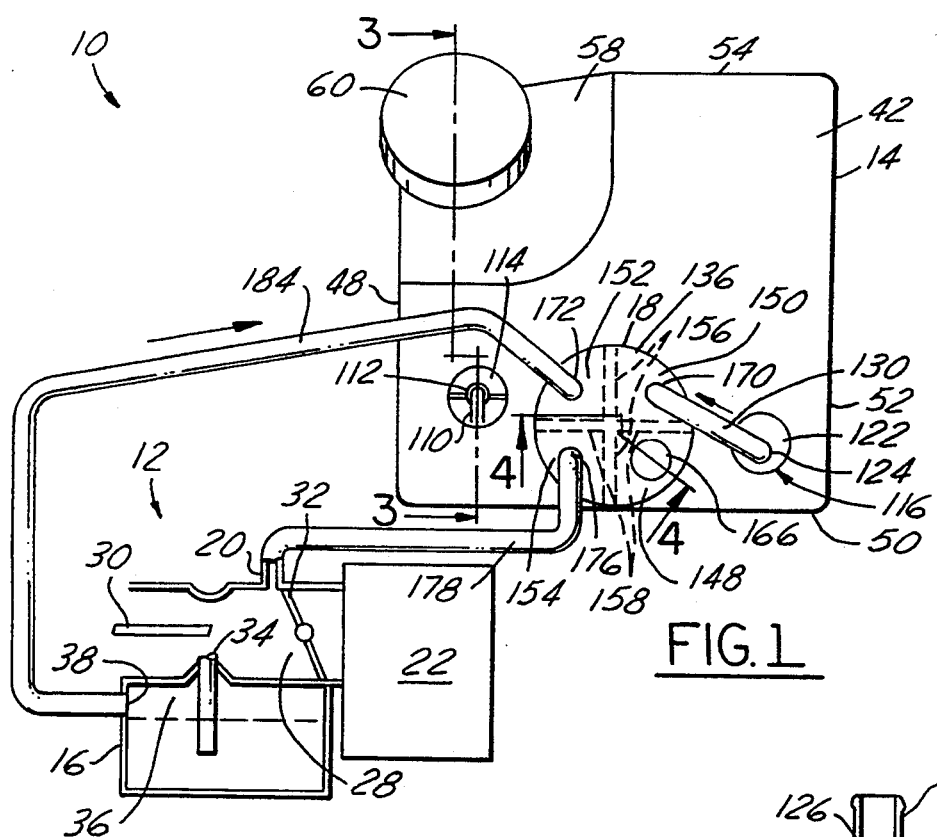
FIG. 1 is a top view of a fuel tank assembly and evaporative emissions control device of this invention with a semi-schematic showing of the device in ported communication with a float bowl carburetor.
Figure 3:
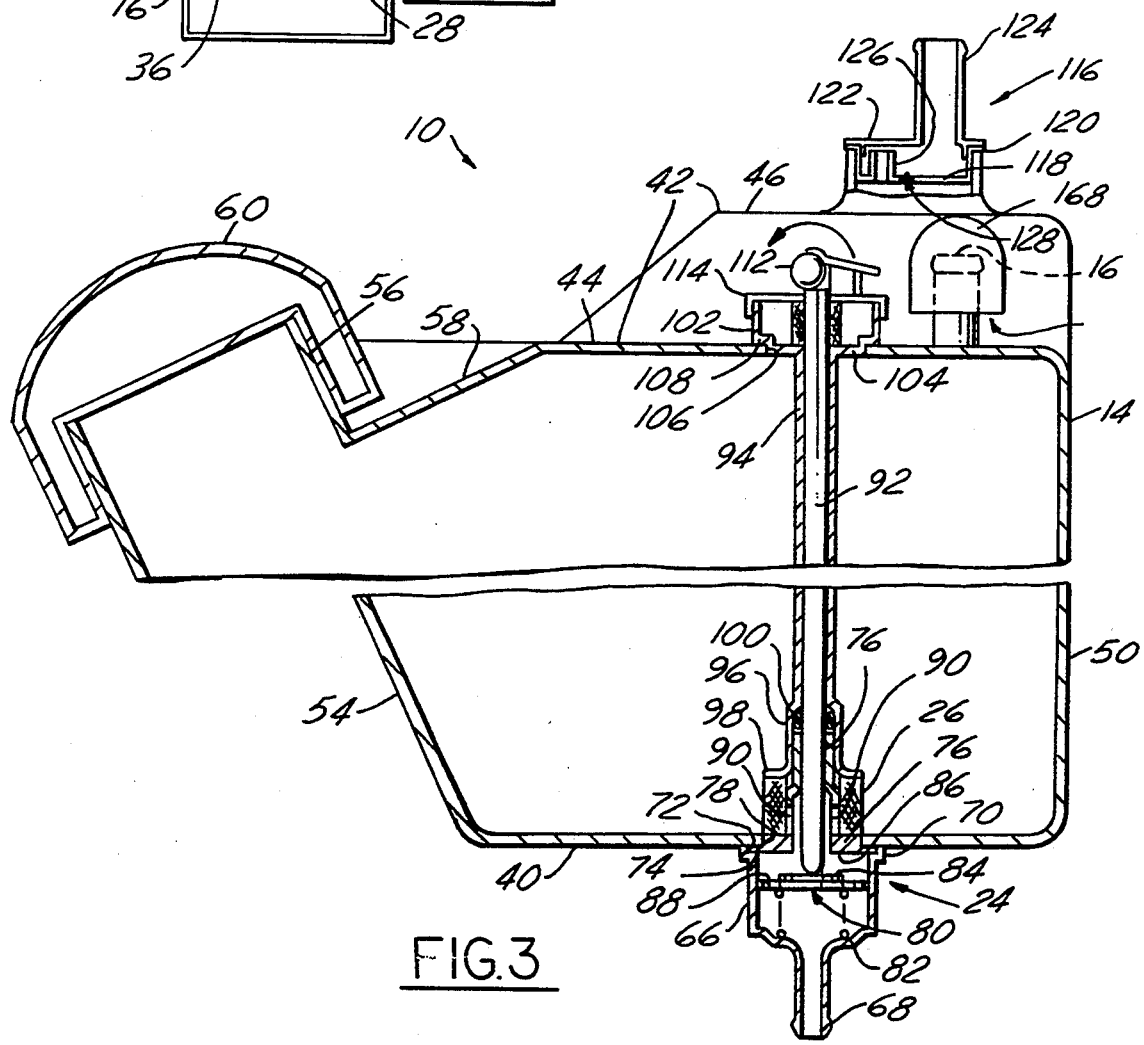
FIG. 3 is a sectional side view taken generally along line 3—3 of FIG. 1 with a middle portion broken away showing a fuel shut-off valve and filter of the tank assembly.
Figure 2:
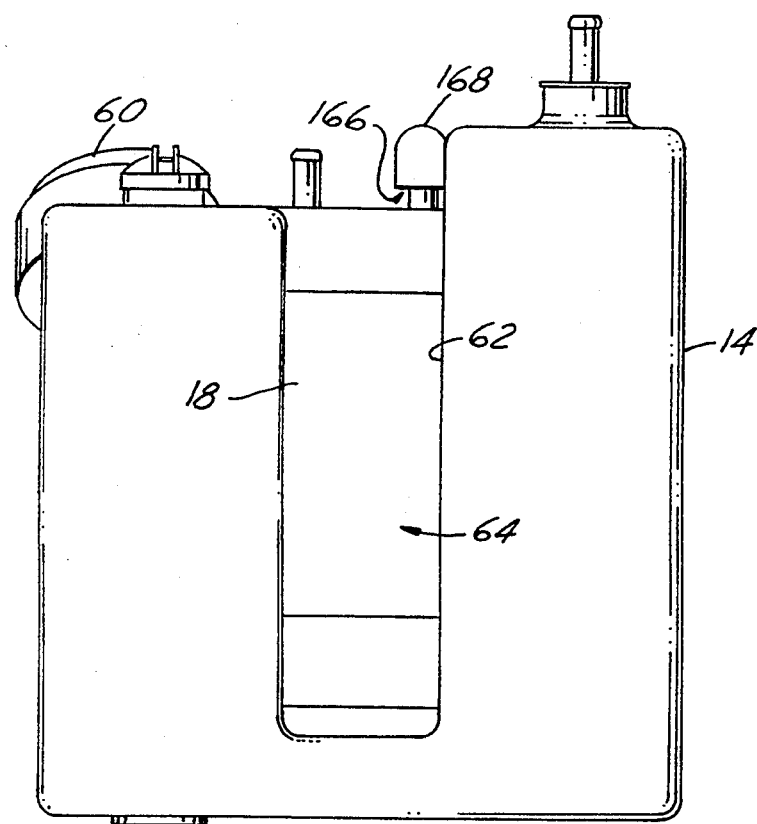
FIG. 2 is a side view of the fuel tank assembly of FIG. 1 showing the carbon canister carried by the fuel tank.

Referring in more detail to the drawings, FIGS. 1 and 3 illustrate a fuel tank assembly 10 for carrying and delivering liquid gasoline fuel to a float bowl carburetor 12 that also collects and contains evaporative emissions from a fuel tank 14 and a float bowl 16 of the carburetor 12. A carbon canister 18 collects and stores evaporative emissions from the float bowl 16 and tank 14 when the engine is turned off, as well as when running at idle. While the engine is running under load, stored emissions are released from the canister 18 and fed to the carburetor through a ported orifice 20 where they are combusted in an internal combustion engine 22. An easily accessible fuel shut-off valve 24 is received in the bottom of the tank with an integral fuel filter 26 and an externally mounted valve lever carried on top of the tank to facilitate fuel shut-off. The compact and one package arrangement of the fuel tank assembly 10 facilitates its use with and mounting on a small utility engine in a manner which does not adversely affect mounting of the engine and assembly on small power tools, and is also compatible with other utility engine applications.

The carburetor 12 has a mixing passage 28 with a choke valve 30 and a throttle valve 32 therein which supplies a combustible mixture of atomized fuel and air to an operating engine. Fuel is supplied to the passage by main fuel jet 34 communicating with liquid fuel in the float bowl of the carburetor. Fuel vapor is bled from an air dome 36 of the bowl through a port 38. In operation, fuel vapor from canister 18 is supplied to the vacuum port 20 communicating with the mixing passage preferably upstream of the throttle.

The fuel tank 14 may be of a conventional configuration and construction of blow molded plastic which facilitates shaping of the tank for a specific engine application. The tank has a generally flat bottom 40, a multi-level top 42 with a substantially flat lower portion 44 and a corresponding upper portion 46, three substantially vertical sidewalls 48, 50 and 52 and a fourth sidewall 54 which is vertically inclined. A fuel filler neck 56 extends upwardly from inclined sidewall 54 and mates with the fuel tank top 42 to form a localized scallop 58. For filling fuel in the tank, an unvented fuel tank cap 60 is removably threaded on and seals with the neck 56. For receiving and carrying the carbon canister 18, a substantially vertical and cylindrical recess 62 is formed in the fuel tank and opens through the top 42. The recess also extends through vertical sidewall 50 to form an opening 64 which exposes a portion of the canister. To ensure that the canister is retained within the recess, the width of the opening is narrower than the diameter of the carbon canister.

As shown in FIG. 3, the fuel shut-off valve assembly 24 controls the supply of fuel from the fuel tank to the carburetor 12 to stop the flow of fuel when the engine 22 is not operating to thereby minimize evaporative emissions from the carburetor which pass to the atmosphere through an air cleaner (not shown) mounted on the carburetor. As shown in FIG. 3, the valve assembly has a generally cup-shaped housing 66 with an outlet tube 68 projecting from its lower end and at its upper end a rim 70 with a holder 72 receiving a flange 74 of a guide bushing 76 received in a hole 78 in the bottom of the tank. The assembly has a valve disc 80 slidably received in the housing and yieldably biased by a compression spring 82 to engage a central rubber sealing disc 84 with a seat 86 on the lower face of the bushing to close the valve. When in the open position, as shown in FIG. 3, fuel flows through holes 88 in the valve disc adjacent its periphery. Fuel is supplied to the valve through an annular filter element 26 slidably received on the tubular body of the bushing over holes 90 communicating with the valve.

The valve assembly 24 has a rod 92 slidably received in a tubular housing 94 with an enlarged lower portion 96 telescopically received over the bushing 76 and terminating in a flange 98 bearing on the top of the filter element 26. A seal is provided between the rod and the tubular housing by an O-ring 100 received between them and trapped by the upper end of the bushing tube. The upper end of the housing terminates in an annular cup 102 with a central bottom portion 104 received and preferably sonic welded in a hole 106 in the tank top with a shoulder 108 bearing thereon. Preferably, the push rod is slidably received in the filter element disposed in the cup. To actuate the push rod, a handle 110 is fixed to a cam 112 bearing on the rod and journalled for rotation on a cap 114 threaded or preferably sonic welded on the cup.

Preferably, the valve housing 66, disc 80, bushing 76, push rod housing 94, and cap 114 are all plastic parts which are not degraded by contact with gasoline fuels. Preferably, the bushing is sonic welded to the housing and threaded into the bottom 40 of the tank 14 to facilitate removal and replacement of the fuel filter 26. To open the valve assembly 24, the cam 112 is manually moved by the handle 110 to the position shown in FIG. 3 to move the push rod 92 downwardly to disengage the valve disc 80 from the seat 84 to permit fuel to flow from the tank through the filter and housing and into the carburetor 12. To close the valve, the cam and lever are rotated counterclockwise (as indicated by the arrow in FIG. 3) which permits the spring to raise the rod and force the valve disc into sealing engagement with the seat to shut off the supply of fuel to the carburetor.

Preferably, the fuel tank 14 also has a trap 116 which allows fuel vapors to pass through the tank while retaining liquid fuel in the tank. The trap has a pan-shaped body 118 with a flange 120 on which a cover 122 with an outlet 124 is received. The body is received in a neck in the top of the tank and both the cover and flange are sealed to each other and the neck by a circumferentially continuous sonic weld. The trap has a vapor inlet tube 126 and a liquid fuel drain slot 128 through the bottom of the body both of which are preferably laterally offset from the vapor outlet. Any fuel splashing through the inlet tube is received in the bottom of the body and drains back into the tank through the slot 128. The construction and arrangement of the trap prevents liquid fuel from passing through the outlet 124 and into the canister. Preferably, a U-shaped vapor line 130 is utilized to further discourage transfer of liquid fuel from the tank to the canister.

Figure 4:
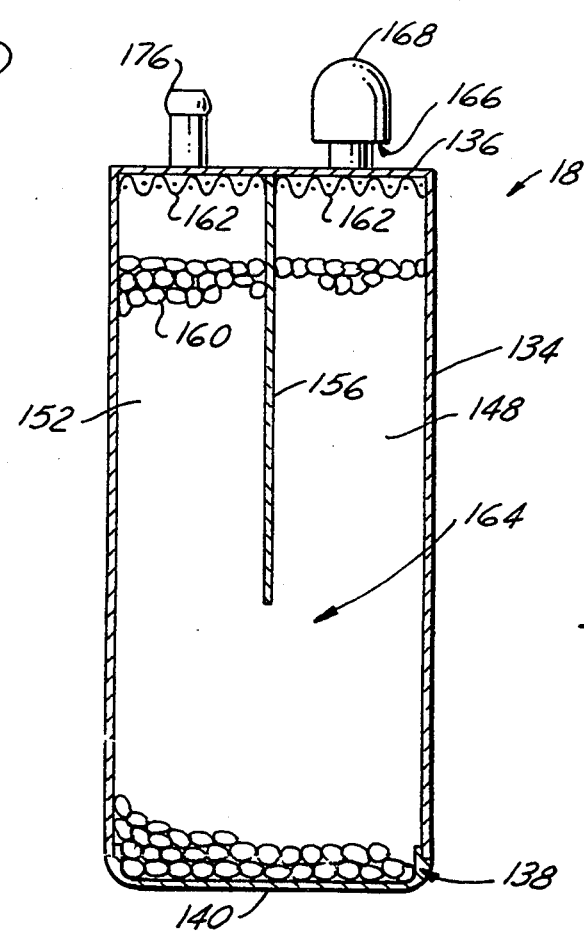
FIG. 4 is a sectional side view of the carbon canister of this invention taken along line 4—4 of FIG. 1.

As shown in FIG. 4, the carbon canister 18 has a cylindrical body 134 of molded plastic with a flat top 136 and an open bottom 138 with a cap 140 sonic welded or preferably threaded into sealing engagement with the bottom of the canister body. The canister body has four chambers 148, 150, 152 & 154 defined by baffle plates 156 and 158 which are integral with the sidewall and top of the body. To retain activated charcoal 160 in the body, a screen 162 is received in the top of each chamber. Charcoal is also received in the open lower portion 164 of the body through which the baffle chambers communicate with each other.

Atmospheric air is supplied to the canister through the first chamber 148 by an atmospheric vent 166 in the top 136 of the canister and having a dust cover 168 received thereon. Vapor from the fuel tank is received in the second chamber 150 through an inlet 170 in the top 136 of the canister which is connected by the vapor line 130 to the vapor outlet 124 of the trap 116 of the fuel tank. Fuel vapor from the carburetor bowl 16 is received in the third chamber 152 through an inlet 172 in the top of the canister which is connected by a line 184 to the vapor outlet port 38 of the float bowl 16 of the carburetor. When the engine is operating, evaporative emissions from the canister are delivered to the engine through the fourth chamber 154 via an outlet or purge port 176 in the top of the canister which is connected by a purge tube 178 to an inlet port 20 in the carburetor upstream of the throttle plate.

The baffle arrangement of the canister optimizes absorption of the fuel vapors emitted from the fuel tank and the bowl of the carburetor. Vapors from the fuel tank pass downwardly through chamber 150, into the common lower portion 164 and upwardly to the chamber 154 before arriving at the purge port 176. Similarly, vapor from the float bowl carburetor passes downwardly through the chamber 152, into the common lower portion 164 and upwardly through the chamber 154 before arriving at the purge port. When the engine is shut off, vapor pressure in the fuel tank and the float bowl expels fuel vapors into the carbon canister where they are absorbed and stored in the activated charcoal. When the engine is running with the throttle at least partially open, the pressure drop produced at the orifice or port 20 draws a vacuum in the canister which removes fuel vapors from the charcoal. Particularly when the engine is running under load with the throttle open, vacuum produced at the orifice 20 causes a substantial quantity of fresh air to flow through the vent 166 and the charcoal canister to discharge fuel vapors from the canister, thereby cleaning and reactivating the charcoal for subsequently absorbing more fuel vapor.

In operation, fuel shut-off valve 24 is opened by rotating handle 110 to downwardly dispose the push rod 92 and to displace the valve plate disc 80 from its seat 84, and transfer fuel from the tank outlet tube 68 to the carburetor 12 and engine 22. Fuel emission vapors from the tank 14 and the float bowl 16 of the carburetor are received and stored in the canister 18 while the engine is running, as well as when the engine is off. To create a vacuum for pulling vapors into the carburetor while the engine is running, the canister purge port 176 is coupled to the ported carburetor orifice 20 just upstream of the throttle valve in the closed position. At idle, with the throttle valve closed, there is little or no vacuum drawn on the canister. As the throttle valve is opened and the edge of the valve passes upstream of the carburetor orifice, a vacuum is pulled on the purge port of the canister which draws fresh air through the carbon canister vent 166 to cleanse the activated charcoal 160 within the canister and to draw off emission vapors released from the charcoal.

The fuel tank assembly of this invention is used to collect evaporative hydrocarbon fumes drawn from the fuel tank of a small utility engine. Additionally, although not necessarily, the assembly further collects evaporative hydrocarbon fumes from the bowl of a float bowl carburetor. When the engine runs at load above idle, a vacuum is drawn on the canister from the carburetor port and stored evaporative vapors are drawn from the carbon canister and delivered to the carburetor and engine for combustion. While the engine is running at idle or is shut off, vapors produced in the tank and carburetor bowl are carried to the canister where they are stored by activated charcoal. Incorporation of an easy access fuel shut-off valve further facilitates containment and control of fuel flow to a small utility engine and enhances the ability to reduce fuel spillage and vapor loss.

What is claimed is:

1. A fuel tank assembly for a non-automotive internal combustion utility engine having a carburetor and comprising:
   a closed fuel tank having a fuel vapor port for drawing off hydrocarbon fumes from said tank, a cavity for nesting and carrying a carbon canister, and a fuel inlet to the interior of said fuel tank,
   an unvented fuel cap receivable on said inlet for closing it and removable for introducing fuel into said tank through said fuel inlet,
   a carbon canister disposed in the nest and carried by the fuel tank and having activated charcoal for absorbing and releasing hydrocarbon fumes,
   a vapor inlet port of said canister continuously communicating with said vapor port of said fuel tank,
   an atmospheric air inlet port of said canister communicating with said activated charcoal therein,
   a vapor purge port of said canister,
   a ported orifice upstream of the position of a closed throttle valve in a carburetor on a non-automotive utility engine continuously communicating with said vapor purge port of said carbon canister for withdrawing hydrocarbon fumes from said canister through said carburetor and into said engine while operating under load, and
   said carbon canister having a closed container with baffles defining at least three chambers communicating with each other adjacent one end thereof, said charcoal being received in all three of said chambers, said vapor purge port continuously communicating with a first one of said chambers adjacent the other end thereof, said vapor inlet port continuously communicating with a second one of said chambers adjacent the other end thereof, and said air inlet port communicating with a third one of said chambers adjacent the other end thereof.

2. The fuel tank assembly of claim 1 which further comprises a port in a float bowl of the continuously communicating with a vapor inlet port of said carbon canister for venting hydrocarbon fumes from said float bowl into said canister for storage and release therefrom.

3. The fuel tank assembly of claim 1 which further comprises a fuel shut-off valve carried by said fuel tank and having an actuating lever extending from said tank for controlling the flow of fuel from said tank and a fuel filter in said tank and communicating with said valve.

4. The fuel tank assembly of claim 1 wherein said fuel tank has a fuel trap communicating with said fuel vapor port and constructed and arranged to retain liquid fuel in said tank by redirecting splashed liquid fuel back into said tank while still permitting passage of hydrocarbon vapors through said fuel vapor port and into said carbon canister.

5. The fuel tank assembly of claim 1 wherein said baffles define at least four chambers in said canister and the assembly further comprises a port in a bowl of the carburetor communicating with a second vapor inlet port of said canister communicating with a fourth one of said chambers adjacent the other end thereof for venting fuel vapor from said float bowl into said canister for storage and release therefrom.

6. The fuel tank assembly of claim 1 wherein said fuel tank has a fuel trap communicating with said fuel vapor port and constructed and arranged to retain liquid fuel in said tank by redirecting liquid fuel splash back into said tank while still permitting passage of fuel vapors through said fuel vapor port and into said carbon canister.

7. A fuel system for a non-automotive internal combustion utility engine comprising: a fuel tank having a fuel vapor port for drawing off hydrocarbon fumes from said tank, a carbon canister carried by said tank and having activated charcoal for absorbing and releasing hydrocarbon fumes, a vapor inlet port of said canister continuously communicating with said vapor port of said fuel tank, an atmospheric air inlet port of said canister communicating with the atmosphere and said activated charcoal in said canister, a vapor purge port of said canister continuously communicating with said charcoal therein, a carburetor for a non-automotive internal combustion utility engine having an air and fuel mixing passage with a throttle valve therein, a port communicating with said mixing passage upstream of the closed position of the throttle valve and continuously communicating with said vapor purge port of said canister for withdrawing hydrocarbon fumes from said canister and atmospheric air through said canister and through said carburetor and into the engine while the engine is operating under load, and said carbon canister having a closed container with baffles defining at least three chambers continuously communicating with each other adjacent one end thereof, said charcoal being received in all three of said chambers, said vapor purge port continuously communicating with a first one of said chambers adjacent the other end thereof, said vapor inlet port continuously communicating with a second one of said chambers adjacent the other end thereof, and said air inlet port continuously communicating with a third one of said chambers adjacent the other end thereof.

8. The fuel system of claim 7 which further comprises a port in a float bowl of the carburetor communicating with a vapor inlet port of said carbon canister for venting hydrocarbon fumes from said float bowl into said canister for storage and release therefrom.

9. The fuel system of claim 7 wherein said fuel tank has a fuel trap communicating with said fuel vapor port and constructed and arranged to retain liquid fuel in said tank by redirecting liquid fuel splash back into said tank while still permitting passage of hydrocarbon vapors through said fuel vapor port and into said carbon canister.

10. The fuel system of claim 7 wherein said baffles define at least four chambers in said canister and the assembly further comprises a port in a bowl of the carburetor continuously communicating with a second vapor inlet port of said canister continuously communicating with a fourth one of said chambers adjacent the other end thereof for venting fuel vapor from said float bowl into said canister for storage and release therefrom.

11. The fuel system of claim 7 which further comprises a fuel shut-off valve carried by said fuel tank and having an actuating lever extending from said tank for controlling the flow of fuel from said tank and a fuel filter in said tank and communicating with said valve.

* * * * *

UNITED STATES PATENT AND TRADEMARK OFFICE
CERTIFICATE OF CORRECTION

PATENT NO. : 5,408,977
DATED : April 25, 1995
INVENTOR(S) : Kenneth J. Cotton

It is certified that error appears in the above-indentified patent and that said Letters Patent is hereby corrected as shown below:

Col. 6, Line 13, change "claim 1" to "claim 5".

Signed and Sealed this

Eleventh Day of July, 1995

Attest:

BRUCE LEHMAN

*Attesting Officer*          *Commissioner of Patents and Trademarks*